United States Patent Office 2,805,124
Patented Sept. 3, 1957

2,805,124

PREPARATION OF SALTS OF N-SUBSTITUTED SULFAMIC ACIDS

Wallace W. Thompson, New Castle, Del., assignor to E. I. du Pont de Nemours and Company, Wilmington, Del., a corporation of Delaware No Drawing. Application November 14, 1955, Serial No. 546,825

9 Claims. (Cl. 23—114)

This invention relates to the preparation of salts of N-substituted sulfamic acids, and to ammonium salts of chlorosulfonic acids and their preparation.

It is well known to prepare a metal salt of N-substituted sulfamic acid by reacting a strong metal base with an ammonium salt of an N-substituted sulfamic acid that was prepared by sulfonating an amine with chlorosulfonic acid. For example, Audrieth et al. Patent No. 2,275,125 discloses the addition of 1 mol of chlorosulfonic acid to 3 mols of cyclohexylamine to give a precipitate of cyclohexylammonium salt of N-cyclohexylsulfamic acid. This precipitate is then reacted with sodium hydroxide to produce sodium cyclohexylsulfamate.

The process of the Audrieth et al. patent has not proven completely satisfactory for large scale operations for several reasons. During the addition of the chlorosulfonic acid to the cyclohexylamine, the reaction mixture becomes extremely viscous so that satisfactory agitation and handling is difficult. To overcome this excessive viscosity of the reaction mixture it is necessary to use so much solvent as to cut the capacity of commercial equipment to an undesirable level. Furthermore, relatively large amounts of undesirable and difficult to remove by-products, such as dicyclohexylsulfamide, are formed during the reaction of the amine with chlorosulfonic acid.

Because of these difficulties it has been preferred to resort to methods that do not involve the use of chlorosulfonic acid for the commercial production of metal salts of substituted sulfamates.

I have found a way to react chlorosulfonic acid with an amine so as to substantially avoid the formation of undesirable by-products and to yield a low viscosity reaction product containing an ammonium salt of an N-substituted sulfamic acid.

My invention centers on the discovery that if chlorosulfonic acid and an amine containing 1 thru 3 hydrogens on the nitrogen are brought together while maintaining the free amine to chlorosulfonic acid mol ratio not greater than 1, an ammonium salt of chlorosulfonic acid surprisingly is formed. The reaction between the amine and chlorine, and the formation of undesirable by-products, are substantially entirely suppressed; the viscosity of the reaction mass remains relatively low.

The process of this invention, therefore, comprises first contacting in an inert solvent substantially equimolar amounts of chlorosulfonic acid with the desired amine. These reactants are brought together in such a way that the mol ratio of free amine to chlorosulfonic acid is maintained at unity or less during the mixing of these reactants.

Equation 1 is illustrative of the first step using specific ingredients:

(1)

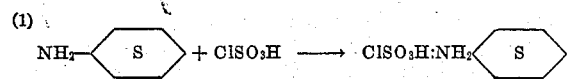

After conversion of substantially all of the chlorosulfonic acid to the ammonium salt of chlorosulfonic acid, an additional quantity of an amine is brought in contact with the ammonium salt of chlorosulfonic acid. Approximately 2 mols of amine ordinarily are added for each mol of ammonium salt of chlorosulfonic acid. These materials react to form an ammonium salt of an N-substituted sulfamic acid and an ammonium salt of the hydrochloric acid. Equation 2 is illustrative of the second step of my invention using specific ingredients:

(2)

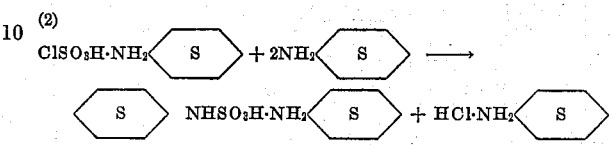

At no time during the reactions of Equations 1 and 2 does the reaction mixture exhibit the characteristic high viscosity of the reaction mixture of the aforementioned Audrieth et al. patent. On the contrary, the reaction mixture is well suited for ordinary fluid handling in conventional commercial apparatus. Furthermore, no substantial quantity of undesirable by-products of side reactions is formed.

The reaction of Equation 1 can be represented generically by the following equation:

(3)  $ClSO_3H + R_nNH_{3-n} \rightarrow R_nNH_{3-n} \cdot HSO_3Cl$

Any desired basic amine having at least one hydrogen attached directly to the amine nitrogen atom can be used in this reaction. Accordingly, R can be a cyclic or acyclic, substituted or unsubstituted monovalent aliphatic radical, or any combination of 2 of such radicals when $n$ equals 2. Also, where $n$ equals 2, two of the R$s$ can be linked to form a divalent chain such as piperidine, morpholine, and pyrrolidine.

Typical of the amines that can be used are monoethylamine, monomethylamine, cyclohexylamine, laurylamine, benzylamine, ammonia, dimethylamine, diethylamine and the like. The preferred amines are ammonia, cyclohexylamine, monomethylamine and dimethylamine.

$n$ in the above equation can be any whole number from 0 thru 2. Where $n$ equals 0 the amine is ammonia; where $n$ equals 1 or 2, the amine is a primary or secondary amine respectively. Thus the product of this reaction is an ammonium salt of chlorosulfonic acid with the ammonium radical being unsubstituted or substituted with from 1 thru 2 aliphatic groups.

In the reaction of Equation 1 it is preferred to use the amine in the free state. However, the amine can be used in the form of an ammonium salt of an acid. This may be desirable when the particular amine is difficult to handle, or when it is desirable to add the chlorosulfonic acid to the amine.

Where free amine is being used in Equation 1, it must be added to the chlorosulfonic acid rather than the chlorosulfonic acid being added to it. If the chlorosulfonic acid were to be added to the amine, the ratio of amine to chlorosulfonic acid would be excessively high during the addition, causing the formation of a viscous reaction mixture containing undesirable by-products.

However, where an amine-acid salt is used as the source of amine, the order of addition of the reactants to the reaction mass is not critical. The amine-acid salts do not dissociate to any great extent in the reaction medium; consequently, there is no substantial amount of free amine in the system when the salt is used as the source of amine. For this reason, the chlorosulfonic acid can be added to a reaction mass containing the required amount of ammonium salt without danger of the amine to chlorosulfonic acid ratio exceeding unity.

If the ammonium salt is used as the source of amine, the acid is freed during the reaction. It should be removed from the reaction mixture prior to the start of the reaction of Equation 2. For this reason, the ammonium salt should be a salt of an acid that is more volatile than chlorosulfonic acid. The acid can then be removed easily such as by warming the reaction mixture or by purging it with an inert gas. Typical of such acids are hydrochloric acid, hydrobromic acid and organic acids such as formic and acetic acid. The preferred ammonium salts are salts of hydrochloric acid.

The reaction of Equation 1 ordinarily is carried out in an organic solvent that is inert to chlorosulfonic acid. By way of example, chloroform, carbon tetrachloride, nitromethane, dichlorobenzene, perchloroethylene and ethylidinedichloride can be used. The amount of solvent used is not critical, with sufficient being used to maintain the mixture sufficiently mobile for ease of handling. The optimum amount in each case can be readily determined by those skilled in the art, and will depend upon the particular solvent and reactants used, the apparatus employed and the specific reaction conditions.

The reaction of Equation 1 is advantageously carried out at a temperature in the range of about $-10°$ to $30°$ C., although substantially higher temperatures can be employed providing the rate of mixing of the reactants is not too rapid. The reaction is highly exothermic and proceeds rapidly. For this reason the rate of addition of the ingredients ordinarily is controlled to maintain the desired reaction temperature.

The ammonium salt of chlorosulfonic acid precipitates from the reaction mixture of Equation 1 and can be isolated by filtration. However, in the preparation of the metal salts of N-substituted sulfamic acids, ordinarily the ammonium salt of chlorosulfonic acid is not recovered.

The reaction of Equation 2 can be represented generically by the following equation:

(4) $R'_nNH_{3-n} \cdot HSO_3Cl + 2R'_mNH_{3-m} \rightarrow$
$R'_mNH_{3-m} \cdot HCl + R_nNH_3 \cdot HSO_3NH_{2-m}R'_m$ In this equation, R and $n$ are the same as set forth above; R' is selected from the same group of organic radicals as R; and $m$ can be any whole number from 0 thru 2. The amine employed in the reaction of Equation 2 can be, and preferably is, the same as the amine used in the reaction of Equation 1. However, an amine-acid salt should not be used as the source of amine for Equation 2 because it will not react readily with the chlorine to form the sulfamic acid.

The reaction of Equation 2 is carried on in an inert organic solvent medium as was the reaction of Equation 1. The reaction product of Equation 1 can be used directly in the reaction of Equation 2, possibly with the addition of more solvent. In this reaction, an excess of amine can be added.

This reaction is also exothermic and proceeds rapidly. The reaction mass is advantageously maintained at a temperature in the range of $-10°$ to $30°$ C. during the addition of the amine although substantially higher temperatures can be used. The order of addition of the reactants in this step is not critical.

The ammonium salt of the N-substituted sulfamic acid present in the reaction product of Equation 2 as a precipitate can be separated from the other components of the mixture by conventional techniques. Alternatively, it can be converted directly to a metal salt of the N-substituted sulfamic acid merely by treating the reaction product with a strong metal base in accordance with conventional techniques.

Any base that is stronger than the amine used in the reactions can be reacted with the ammonium salt of the N-substituted sulfamic acid. Typical of such bases are alkali metal, alkaline earth metal, and nitrogenous bases. For example sodium hydroxide, calcium hydroxide, calcium oxide, magnesium hydroxide, sodium carbonate and tetramethylammonium hydroxide can be used.

When the ammonium salt of the N-substituted sulfamic acid is isolated from the reaction product of Equation 2, it can be added to an aqueous solution or slurry of the desired base to form the desired sulfamate salt. Alternatively, when the ammonium salt is not recovered from the reaction product, then an aqueous solution or slurry of the base can be added directly to the reaction mixture. For a more comprehensive discussion of the preparation of metal sulfamates from an ammonium salt of an N-substituted sulfamic acid see Robinson Patent No. 2,383,617 and the above-mentioned Audrieth et al. patent.

In order that the invention can be better understood, the following examples in addition to those set forth above are given:

*Example 1*

59 grams of chlorosulfonic acid are added slowly to an agitated slurry of 68 grams of cyclohexylammonium chloride in 400 ml. of chloroform. The temperature is maintained at about 10° C. by external ice cooling. After all of the chlorosulfonic acid is added, the mixture is allowed to warm slowly to room temperature overnight. The reaction product comprises a precipitate of the cyclohexylammonium salt of chlorosulfonic acid. Most of the hydrogen chloride freed during the reaction escapes immediately as a gas.

Over a period of 20 minutes, 100 grams of cyclohexylamine are then added to the reaction mixture. After all the amine has been added, the slurry is heated to reflux for one hour. During this second addition of amine, the cyclohexylamine salt of chlorosulfonic acid is converted to the cyclohexylamine salt of cyclohexylsulfamic acid. The cyclohexylamine salt of hydrochloric acid is also formed.

A solution of 50 grams of sodium hydroxide in 500 ml. of water is then added rapidly to the reaction product. The chloroform layer is removed and washed three times with 50 ml. of water. The water washes are added to the water layer remaining after the chloroform layer is removed. The excess cyclohexylamine remaining in the aqueous layer is removed by azeotropically distilling 310 ml. The distillation residue is concentrated to 300 ml. volume and crystallized by cooling and agitation.

After filtering, washing with water and drying, essentially pure crystalline sodium cyclohexylsulfamate is obtained. Additional product is obtained from the filtrate by concentration and crystallization.

*Example 2*

59 grams of chlorosulfonic acid are slowly added to an agitated slurry of 68 grams of cyclohexylammonium chloride in 350 ml. of chloroform maintaining the temperature at about 8° C. with external cooling. The reaction mixture containing a white precipitate is allowed to warm slowly to room temperature while agitating overnight.

During the addition and slow warming, a stream of nitrogen is passed over the reaction mixture and bubbled through a sodium hydroxide solution to trap all the hydrogen chloride that is liberated during the reaction. A chloride titration of this scrubber after the slow warming period shows that the theoretical amount of hydrogen chloride according to the following equation has been liberated:

$ClSO_3H + C_6H_{11}NH_2 \cdot HCl \rightarrow C_6H_{11}NH_2 \cdot HSO_3Cl + HCl$ After the warming period, the chloroform is removed as completely as possible by vacuum distillation. The solid residue is further dried to constant weight in a vacuum oven at 50° C. with a slow stream of nitrogen passing thru the oven to remove the vaporized chloroform.

A sample of the solid product is removed and analyzed for chlorine by silver nitrate titration of an aqueous solution, and for acid content by titration with dilute sodium hydroxide. The results of these titrations are extremely consistent, showing the solid product to consist predominantly of the cyclohexylammonium salt of chlorosulfonic acid.

A small sample of the chloroform solution of the original reaction product taken prior to the vacuum distillation is analyzed by means of an infrared spectrum. The peaks of the absorption curve are consistent with those present in an infrared spectrum of cyclohexylammonium chlorosulfonate.

Another sample of the solid residue is alternately exposed to moist air and dried in the vacuum oven as above until no sharp odor of hydrogen chloride can be detected. The following reaction occurs on exposure to moist air:

$$C_6H_{11}NH_2HSO_3Cl + H_2O \rightarrow C_6H_{11}NH_2HSO_3OH + HCl$$
$$\text{Cyclohexylammonium bisulfate}$$

The cyclohexylammonium bisulfate has a melting point of 117–118° C. (uncorrected) and analysis as follows:

| Anal. | Found | Calc'd. |
|---|---|---|
| C | 37.28 | 36.53 |
| H | 7.75 | 7.66 |
| N | 6.94 | 7.10 |
| S | 16.40 | 16.25 |
| SO₄ | 49.13 | 48.69 |
| Neutral eq | 199 | 197 |

The reaction of the solid residue with water to form cyclohexylammonium bisulfate in accordance with the above equation clearly demonstrates that the solid residue is the cyclohexylammonium salt of chlorosulfonic acid; no substantial reaction between the amine and the chlorine atom of the chlorosulfonic acid takes place during the reaction with the first molar equivalent of amine employed in the practice of the present invention.

Example 3

59 grams of chlorosulfonic acid are added slowly to an agitated slurry of 116 grams of the laurylammonium salt of formic acid in 500 ml. of o-dichlorobenzene. The temperature is maintained at about 20° C. After all of the chlorosulfonic acid is added, the mixture is concentrated under vacuum to half volume maintaining the residual temperature below 90° C. The liberated formic acid is removed with the distilled solvent. After cooling, the reaction product comprises a precipitate of the laurylammonium salt of chlorosulfonic acid.

Over a period of 20 minutes, 185 grams of laurylamine are then added to the reaction mixture. After all of the amine has been added the reaction mixture is stirred for several hours. During this time the lauryl ammonium salt of chlorosulfonic acid is converted to the laurylammonium salt of the laurylsulfamic acid.

50 grams of sodium hydroxide in 500 ml. of water is then added rapidly to the reaction product. The o-dichlorobenzene layer is removed and washed three times with water. The water washes are added to the water layer remaining after the o-dichlorobenzene layer is removed. The excess laurylamine remaining in the aqueous layer is removed by azeotropically distilling 310 ml. The distillation residue is concentrated to 300 ml. volume and crystallized by cooling and agitation.

After filtering, washing with water and drying, essentially pure crystalline sodium laurylsulfamate is obtained.

Example 4

Pure crystalline sodium benzylsulfamate is prepared in accordance with the procedure of Example 3 by substituting equimolar amounts of benzylammonium bromide and benzyl amine for the laurylammonium salt of formic acid and laurylamine of Example 3.

This compound is also prepared by combining these reactants in a similar manner in an ethylene chloride reaction medium.

Example 5

Essentially pure sodium morpholine sulfamate is prepared in accordance with the procedure of Example 3 by substituting equimolar amounts of the morpholine salt of acetic acid and morpholine for the laurylammonium salt of formic acid and laurylamine of Example 3.

This reaction is also carried on readily in a perchloroethylene reaction medium and at a temperature of 10° C., and in an acetylene tetrachloride reaction medium at a temperature of 30° C.

Example 6

A solution of 8½ grams of ammonia dissolved in 100 ml. of nitromethane at −10° C. is added slowly to an agitated solution of 59 grams of chlorosulfonic acid in 300 ml. of nitromethane at −10° C. After all of the chlorosulfonic acid is added, the mixture is allowed to warm slowly to room temperature overnight, with external cooling being maintained during the initial standing period. A precipitate of the ammonium salt of chlorosulfonic acid forms.

Over a period of 20 minutes, a solution of 17 grams of ammonia in 100 ml. of nitromethane at −10° C. is then added to the reaction mixture. After this addition, the reaction mixture is stirred for one hour. The ammonium salt of sulfamic acid, that is ammonium sulfamate, precipitates from the reaction mixture together with some by-product ammonium chloride, and is separated therefrom by filtration. Purification of the precipitate is accomplished by crystallization from water.

Example 7

The methylammonium salt of methylsulfamic acid is prepared in accordance with the procedure of Example 6 by substituting equimolar amounts of methylamine for the ammonia of Example 6.

This reaction is also carried on readily using chloroform, carbon tetrachloride, and trichloroethylene as the reaction medium, and at temperatures of 0° C. and 5° C.

Example 8

The dimethylammonium salt of dimethylsulfamic acid is prepared in accordance with the procedure of Example 6 by substituting equimolar amounts of dimethylamine for the ammonia of Example 6.

Example 9

The diethylammonium salt of diethylsulfamic acid is prepared in accordance with the procedure of Example 6 by substituting equimolar amounts of diethylamine for the ammonia of Example 6.

The following compounds are also prepared in accordance with the procedure of Examples 1–9 by substituting equimolar amounts of the appropriate amine for the amines of these examples:

10. Sodium butylsulfamate
11. Dibutylammonium dibutylsulfamate
12. Sodium dicyclohexylsulfamate
13. Hexadecylammonium chlorosulfonate
14. Isopropylammonium chlorosulfonate
15. Beta-phenylethylammonium chlorosulfonate
16. Sodium piperidinesulfamate
17. Stearylammonium stearylsulfamate
18. Sodium pyrrolidinesulfamate

I claim:

1. The process for preparing a salt of a sulfamic acid comprising bringing together equimolar amounts of chlorosulfonic acid and a material selected from the group consisting of basic amines containing from 1 thru 3 hydrogens attached directly to the amine nitrogen atom and salts thereof with acids that are more volatile than chlorosulfonic acid, the mol ratio of said material to chlorosulfonic acid being not greater than 1 during said bringing together, whereby the ammonium salt of chlorosulfonic acid is formed; and then, after conversion of substantially all of the chlorosulfonic acid to the ammonium salt of chlorosulfonic acid, bringing in contact with the ammonium salt of chlorosulfonic acid a basic amine containing from 1 thru 3 hydrogens attached directly to the amine nitrogen atom, whereby an ammonium salt of a sulfamic acid is formed.

2. The method in accordance with claim 1 wherein said ammonium salt of a sulfamic acid is reacted with a strong base to form a salt of a sulfamic acid.

3. The process for preparing the cyclohexylamine salt of cyclohexylsulfamic acid comprising bringing together equimolar amounts of chlorosulfonic acid and a source of cyclohexylamine, the mol ratio of cyclohexylamine to chlorosulfonic acid being not greater than 1 during said bringing together, whereby the cyclohexylamine salt of cholorsulfonic acid is formed; and then, after conversion of substantially all of the chlorosulfonic acid to the cyclohexylamine salt of chlorosulfonic acid, bringing cyclohexylamine in contact with the cyclohexylamine salt of chlorosulfonic acid to produce the cyclohexylamine salt of cyclohexylsulfamic acid.

4. The process of preparing ammonium sulfamate comprising bringing together equimolar amounts of chlorosulfonic acid and a source of ammonia, the mol ratio of ammonia to chlorosulfonic acid being not greater than 1 during said bringing together, whereby the ammonium salt of chlorosulfonic acid is formed; and then, after conversion of substantially all of the chlorosulfonic acid to the ammonium salt of chlorosulfonic acid, bringing ammonia in contact with the ammonium salt of chlorosulfonic acid to produce ammonium sulfamate.

5. The process for preparing a salt of a sulfamic acid comprising bringing together equimolar amounts of chlorosulfonic acid and a material selected from the group consisting of basic amines containing from 1 thru 3 hydrogens attached directly to the amine nitrogen atom and salts thereof with acids that are more volatile than chlorosulfonic acid, the mol ratio of said material to chlorosulfonic acid being not greater than 1 during said bringing together; and then adding to the reaction mass a basic amine containing from 1 thru 3 hydrogens attached directly to the amine nitrogen atom.

6. The step of preparing an ammonium salt of chlorosulfonic acid by contacting chlorosulfonic acid with a material selected from the group consisting of basic amines containing from 1 thru 3 hydrogens attached directly to the amine nitrogen atom and salt thereof with acids that are more volatile than chlorosulfonic acid, the mol ratio of said material to chlorosulfonic acid being not greater than 1 during said contacting, whereby the ammonium salt of chlorosulfonic acid is formed.

7. The method in accordance with claim 6 wherein said material is cyclohexylamine.

8. The method in accordance with claim 6 wherein said material is a cyclohexylamine salt with an acid that is more volatile than chlorosulfonic acid.

9. Cyclohexylammonium salt of chlorosulfonic acid.

References Cited in the file of this patent

UNITED STATES PATENTS

| | | |
|---|---|---|
| 2,218,729 | Tauch et al. | Oct. 22, 1940 |
| 2,275,125 | Audrieth et al. | Mar. 3, 1942 |
| 2,383,617 | Robinson | Aug. 28, 1945 |
| 2,514,955 | Kamlet | July 11, 1950 |

FOREIGN PATENTS

| | | |
|---|---|---|
| 669,200 | Great Britain | Mar. 26, 1952 |